(12) United States Patent
Magraner Bonifacio

(10) Patent No.: US 11,119,486 B2
(45) Date of Patent: Sep. 14, 2021

(54) METHODS AND APPARATUS TO MONITOR AND CONTROL MOBILITY VEHICLES

(71) Applicant: Ford Global Technologies, LLC, Dearborn, MI (US)

(72) Inventor: Jose Daniel Magraner Bonifacio, Alzira (ES)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 16/330,826

(22) PCT Filed: Sep. 13, 2016

(86) PCT No.: PCT/US2016/051522
§ 371 (c)(1),
(2) Date: Mar. 6, 2019

(87) PCT Pub. No.: WO2018/052401
PCT Pub. Date: Mar. 22, 2018

(65) Prior Publication Data
US 2019/0212743 A1   Jul. 11, 2019

(51) Int. Cl.
*G05D 1/02* (2020.01)
*B60L 15/20* (2006.01)
(Continued)

(52) U.S. Cl.
CPC ............ *G05D 1/021* (2013.01); *A61G 5/04* (2013.01); *A61G 5/06* (2013.01); *A61G 5/10* (2013.01);
(Continued)

(58) Field of Classification Search
CPC . G05D 1/021; A61G 5/10; A61G 5/06; A61G 5/04; B60N 2/797; B60N 2/002;
(Continued)

(56) References Cited

U.S. PATENT DOCUMENTS 5,923,096 A    7/1999  Manak
6,089,341 A *  7/2000  Gingerich ........... B60L 15/2036
                                                       180/65.1
(Continued)

FOREIGN PATENT DOCUMENTS

CN        1873566        12/2006
CN       102149596        8/2011
(Continued)

OTHER PUBLICATIONS

China National Intellectual Property Administration, "Notification of First Office action," issued in connection with Application No. 2016800892576, dated Apr. 3, 2020, 16 pages.
(Continued)

*Primary Examiner* — Richard M Camby
(74) *Attorney, Agent, or Firm* — Brandon Hicks; Hanley, Flight & Zimmerman, LLC

(57) ABSTRACT

Methods, apparatus, systems and articles of manufacture to provide an improved mobility vehicle are disclosed. An example vehicle includes a sensor positioned with respect to a seat to detect pressure by a user with respect to the sensor and to generate a signal corresponding to the pressure; and a processor to convert the signal into a control command for a powertrain to move the vehicle.

20 Claims, 10 Drawing Sheets

(51) Int. Cl.
  *A61G 5/10* (2006.01)
  *A61G 5/06* (2006.01)
  *A61G 5/04* (2013.01)
  *B60N 2/75* (2018.01)
  *B60L 15/30* (2006.01)
  *B60N 2/00* (2006.01)

(52) U.S. Cl.
  CPC ........... *B60L 15/2036* (2013.01); *B60L 15/30* (2013.01); *B60N 2/797* (2018.02); *B60L 2200/24* (2013.01); *B60L 2200/34* (2013.01); *B60L 2220/42* (2013.01); *B60L 2250/00* (2013.01); *B60L 2250/16* (2013.01); *B60L 2250/24* (2013.01); *B60N 2/002* (2013.01); *Y02T 10/64* (2013.01); *Y02T 10/72* (2013.01)

(58) Field of Classification Search
  CPC .. B60L 15/30; B60L 15/2036; B60L 2220/42; B60L 2250/00; B60L 2200/34; B60L 2200/24; B60L 2250/16; B60L 2250/24; Y02T 10/64; Y02T 10/72
  See application file for complete search history.

(56) References Cited

U.S. PATENT DOCUMENTS

| | | | | |
|---|---|---|---|---|
| 8,006,796 | B1* | 8/2011 | Fontaine | B60K 17/356 180/235 |
| 8,504,248 | B2 | 8/2013 | Taira et al. | |
| 2002/0067175 | A1* | 6/2002 | Kiribayashi | B60N 2/002 324/713 |
| 2002/0105178 | A1* | 8/2002 | Cresswell | B60R 21/01516 280/735 |
| 2002/0125050 | A1* | 9/2002 | Breed | B60N 2/829 177/136 |
| 2002/0130673 | A1* | 9/2002 | Pelrine | H01L 41/1132 324/727 |
| 2002/0167486 | A1* | 11/2002 | Tan | B60N 2/002 345/156 |
| 2003/0023362 | A1* | 1/2003 | Breed | B60N 2/0248 701/45 |
| 2004/0260445 | A1* | 12/2004 | Francischetti | B60W 10/08 701/70 |
| 2009/0287367 | A1 | 11/2009 | Salinger | |
| 2010/0179731 | A1* | 7/2010 | Le | B60R 21/0136 701/47 |
| 2011/0029169 | A1* | 2/2011 | Kell | B60L 15/20 701/22 |
| 2013/0179029 | A1* | 7/2013 | Wang | H04L 69/22 701/32.7 |
| 2013/0238168 | A1* | 9/2013 | Reyes | G05D 1/0022 701/2 |
| 2014/0303869 | A1* | 10/2014 | Kanayama | G05D 1/021 701/93 |

FOREIGN PATENT DOCUMENTS

| | | |
|---|---|---|
| CN | 104161629 | 11/2014 |
| DE | 10032996 | 1/2002 |
| EP | 1731354 | 12/2006 |
| KR | 20130030140 | 3/2013 |
| WO | 2015179760 | 11/2015 |

OTHER PUBLICATIONS

International Searching Authority, "Search Report and Written Opinion," issued in connection with PCT patent application No. PCT/US16/51522, dated Dec. 20, 2016, 10 pages.
International Searching Authority, "International Preliminary Report on Patentability," issued in connection with PCT patent application No. PCT/US16/51522, dated Mar. 19, 2019, 8 pages.
"Hitachi's Robits Mobility Robot drives itself", last retrieved Aug. 1, 2019, 5 pages.
Chinese Patent Office, "Second Office action," issued in connection with CN patent application No. 2016800892576, dated Jan. 5, 2021, 38 pages.

* cited by examiner

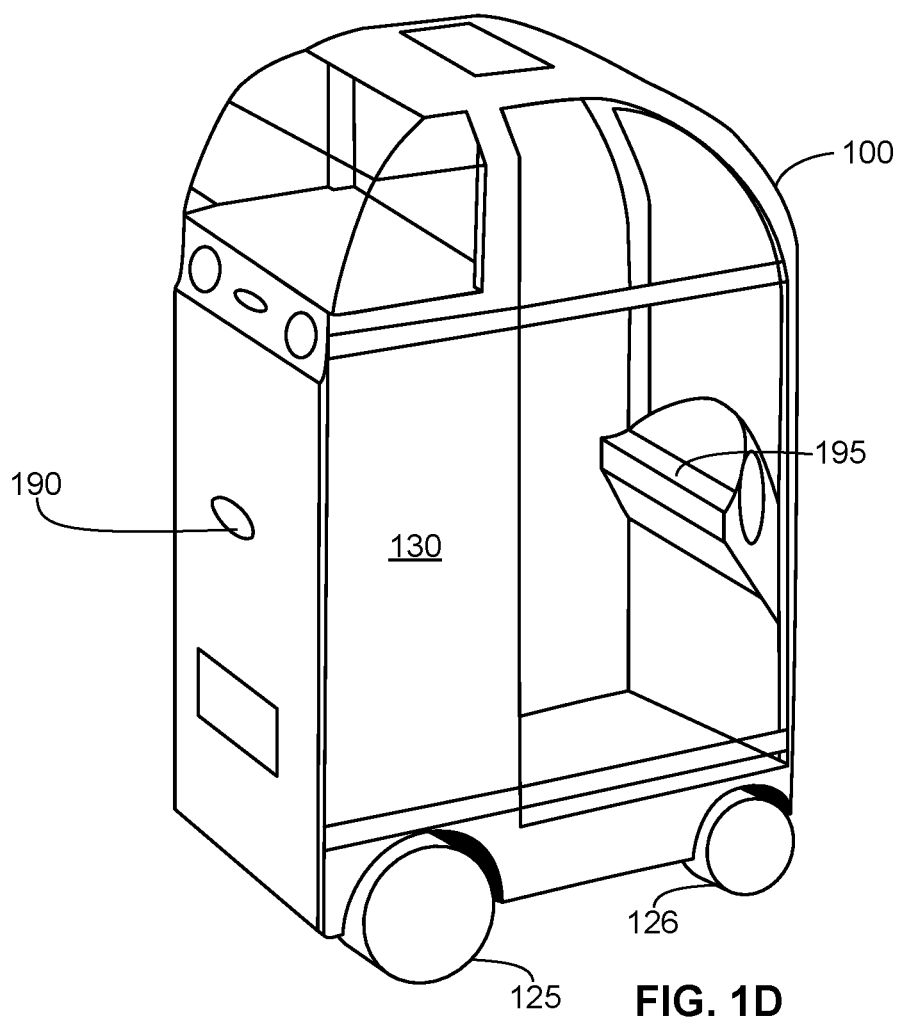

METHODS AND APPARATUS TO MONITOR AND CONTROL MOBILITY VEHICLES

FIELD OF THE DISCLOSURE

This disclosure relates generally to mobility vehicles and, more particularly, to methods and apparatus to monitor and control mobility vehicles.

BACKGROUND

Large cities with growing populations contend with competing needs for physical space including space for mobility of vehicles and people. According to a 2015 Urban Mobility Scorecard released by Texas A&M Transportation Institute, America's drivers spent 6.9 billion hours stuck in traffic in 2014, an average of nearly an hour a week wasted. In larger cities generating greater congestion, approximately 1.5 hours a week is wasted stuck in traffic. Cities struggle to manage physical space while still facilitating movement of people and goods.

BRIEF DESCRIPTION OF THE DRAWINGS

FIGS. 1A-1D illustrate an example improved mobility vehicle.

The figures are not to scale. Wherever possible, the same reference numbers will be used throughout the drawing(s) and accompanying written description to refer to the same or like parts.

BRIEF SUMMARY

Figure 1A:
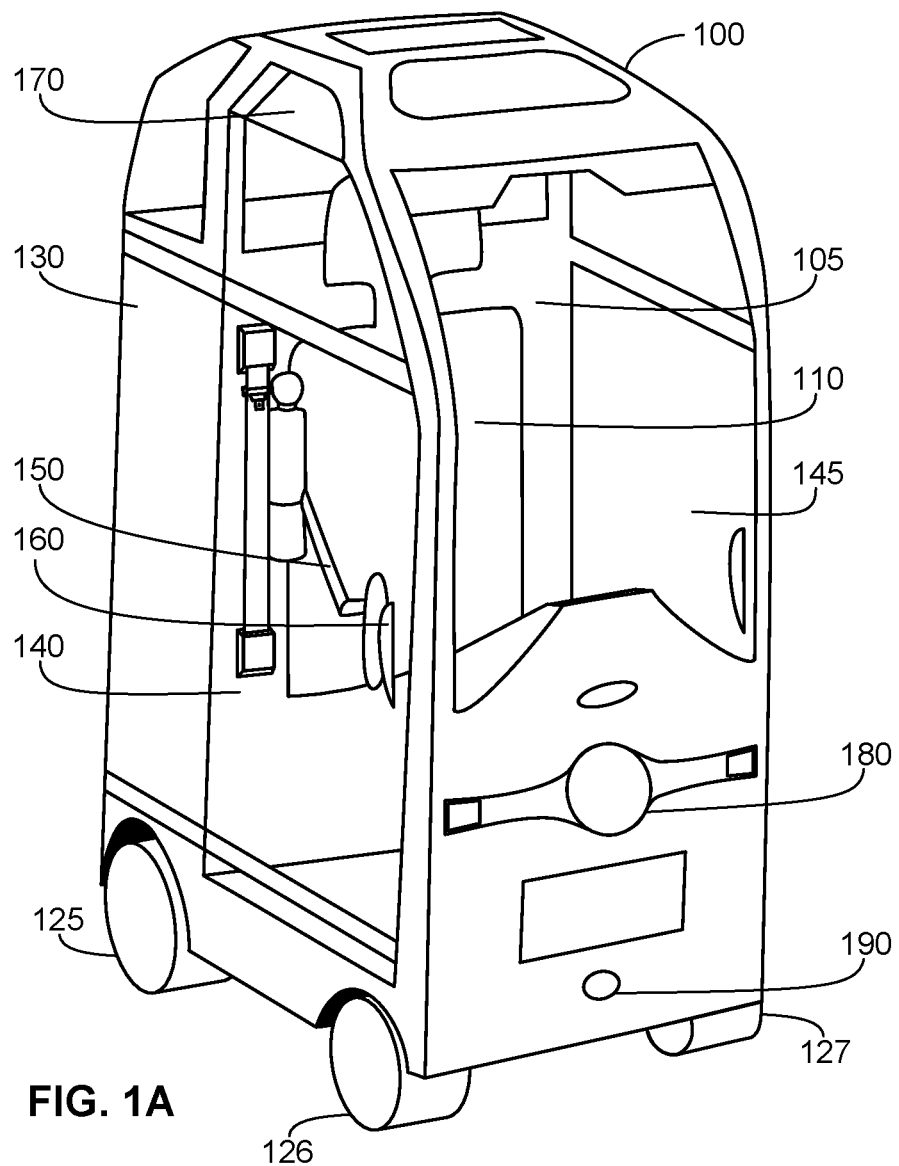

Methods, apparatus, systems and articles of manufacture to provide an improved mobility vehicle are disclosed.

Certain examples provide a vehicle including a sensor positioned with respect to a seat to detect pressure by a user with respect to the sensor and to generate a signal corresponding to the pressure. The example vehicle also includes a processor to convert the signal into a control command for a powertrain to move the vehicle.

Certain examples provide a tangible computer readable storage medium including instructions. The example instructions, when executed, cause a machine to at least detect pressure by a user with respect to a sensor in a vehicle, the sensor positioned with respect to a seat in the vehicle. The example instructions, when executed, cause a machine to at least generate a signal corresponding to the pressure. The example instructions, when executed, cause a machine to at least convert the signal into a control command for a powertrain to move the vehicle.

Certain examples provide a method including detecting, using a sensor, pressure by a user with respect to the sensor in a vehicle, the sensor positioned with respect to a seat in the vehicle. The example method includes generating, by executing an instruction with a processor, a signal corresponding to the pressure. The example method includes converting, by executing an instruction with the processor, the signal into a control command for a powertrain to move the vehicle.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain examples facilitate transportation of people and cargo using a smart, self-propelled vehicle with improved maneuverability and usage of space. Certain examples provide a smart mobility vehicle. In some examples, the vehicle is a self-propelled vehicle that moves and maneuvers without a steering wheel or pedals. In some examples, the absence of a steering wheel and/or pedals allows a passenger space or vehicle cab size to be reduced while still accommodating one or more passengers. Thus, in large cities with growing populations in which improved or optimal use of available physical space is encouraged, a smaller vehicle can be provided while still satisfying the needs of individual mobility and cargo transport, for example.

Certain examples provide a vehicle in which a driver's vertical position and use of sliding doors reduces occupied space and allows comfortable access to the vehicle. In certain examples, armrests are equipped with sensors to allow driving of the vehicle without a steering wheel and/or pedals. Space savings through driver position, sliding door(s), sensor placement, and absence of steering wheel and/or pedals provides increased capacity for cargo loading volume, for example. In certain examples, a user's mobile computing device, such as a smartphone, tablet, etc., can be used as a dashboard for the vehicle. Thus, the user can view and/or modify vehicle settings, control the vehicle, communicate, etc., via the mobile device tethered and/or otherwise in communication with (e.g., Bluetooth™, Bluetooth™ Low Energy (BLE), Wi-Fi™, near field communication (NFC), cellular, physical cable, etc.) with the vehicle. In certain examples, the vehicle can be remotely controlled, managed, etc., to facilitate maneuvering, refueling/charging (e.g., solar charging at a docking/charging station), locking, etc. In some examples, automated driverless maneuvering of the vehicle to enter and exit charging stations, cargo loading areas, parking spaces, etc., allow a reduction in space allocated to such areas.

FIG. 1A illustrates an example vehicle 100 facilitating passenger and/or cargo mobility with streamlined cab and controls. The example vehicle 100 includes a vertical cab 105 including a seat 110. The example vehicle 100 is driven by two electric powertrains 120, 122 (left and right powertrains, not shown, including engine, transmission, drive shaft, differential, and final drive to generate power and deliver the power to a road surface) connected to wheels 125-128 and includes a rear cargo space 130 and sliding doors 140, 145. The design of the example vehicle 100 reduces or minimizes the space occupied by the vehicle 100 in circulation as well as in parking and/or recharge stations, for example.

The seat 110 of the example vehicle 100 includes an armrest 150. The armrest 150 includes one or more sensors 160. Control of the vehicle 100 is facilitated by the sensor(s) 160 installed in, on, and/or under the armrest(s) 150. Using the armrest sensor(s) 160 can eliminate a steering wheel and/or pedal(s) in the cab 110 of the vehicle 100. Additionally, rather than a traditional dashboard, a mobile device, such as a smartphone, tablet, laptop, etc., can be used as a dashboard to view vehicle 100 information, monitor vehicle 100 performance, control vehicle 100 operation, etc.

The enclosed cabin 105 is equipped with an air filter unit 170 to generate cleaner air inside the cab 105. Additionally, the vehicle 100 can be equipped with one or more communications interfaces 180, such as Wi-Fi, cellular, Smart Bluetooth, and Sub 1 GHz long range transceiver, etc. These communication channels enable connectivity with user devices, other vehicles, environment, charging stations (e.g., solar and/or other electric charging, etc.), control center, etc. For example, the long range transceiver allows remote management and tight integration in mobility ecosystems. In some examples, instead of or in addition to the communications interface(s) 180, the user's mobile device (e.g., smart phone, tablet, etc.) can be used to facilitate communication between the vehicle 100 and one or more external systems. In such examples, the communications interface 180 facilitates tethering of the user device to one or more vehicle 100 systems such as powertrains 120, 122, door(s) 140 and/or 145, sensor 160, air filter unit 170, etc.

In certain examples, one or more short range sensors 190 (e.g., ultrasonic sensors, etc.) can be included in and/or on the vehicle 100 and used for automated driverless maneuverings, for example. The vehicle can also be equipped with other sensors to enable autonomous driving capability (e.g., camera(s), Light Detection and Ranging (LIDAR), etc.).

Thus, integrated technologies, such as mobile device dashboard, control sensor(s) 160 communication interface(s) 180, and/or maneuverability sensor(s) 190 assist a user in executing an itinerary using his or her own electronically tethered device. The vehicle 100 can be integrated into a smart mobility ecosystem through its different communication interfaces 180. In certain examples, autonomous and integrated maneuvers, as well as assisted driving via the sensor(s) 190 and controls, allow an improved user experience.

For example, the sensor(s) 190 can be used to maintain a set cruising speed, bring the vehicle 100 to a comfortable stop, and/or maintain a safe following distance from a vehicle ahead, behind and/or otherwise adjacent to the vehicle 100, etc. A combination of the sensor(s) 190 and software can operate together and/or further in conjunction with the control sensor(s) 160 to operate the vehicle 100 and its powertrains 120, 122 (e.g., by providing adaptive cruise control, sensor-based maneuvering, driving assistance, etc.). For example, the sensor(s) 190 can include a radar-and-camera based system which, when activated, reads the road periodically (e.g., every 30 milliseconds, every 50 milliseconds, etc.) to track traffic and adjust speed, direction, braking, etc., according to monitored traffic flow. As another example, the radar-and-camera based system can be used to watch the road ahead for potential collisions with another vehicle, pedestrian, other obstacle, etc. When a situation is detected, the sensors 190, alone or in conjunction with a tethered user mobile device, provide a visual and/or audible warning to the driver, pre-charge the brakes of the vehicle 100, and, if necessary, automatically apply up to full braking force to stop or slow the vehicle 100, thus helping to reduce the severity of, or even eliminate, some collisions.

In another example, the sensor(s) 190 can include a LIDAR sensor that can be used to gather information about road, obstacle, environment, etc., around the vehicle 100 without light (e.g., at night, in a tunnel, etc.). LIDAR data can be used by software to steer the vehicle 100 in low light or dark environment, for example. For example, LIDAR data gathered by the sensor(s) 190 can be used with high-resolution three-dimensional (3D) maps including information about the road, road markings, geography, topography and landmarks such as signs, buildings, trees, etc. The vehicle 100 (e.g., via the user's mobile device and/or other processor integrated with the sensor(s) 190, the powertrains 120, 122, and/or other part of the vehicle 100, uses LIDAR pulses to determine vehicle 100 location on the map in real time (or substantially real time given transmission and/or processing delay). In some examples, additional data from radar is combined with the LIDAR data to provide a more complete sensing capability for the vehicle 100.

In certain examples, the sensor(s) 190 provide steering assistance to park the vehicle 100 in a parallel or perpendicular parking spot and/or to pull out from tight parallel parking spots. Certain examples include side park distance control (e.g., distance from curb, vehicle, etc.) via the sensor(s) 190.

In certain examples, the sensor(s) 190 monitor lane marking(s) with respect to the vehicle 100 and trigger steering and/or alert when the vehicle 100 drifts out of its lane. For example, a lane-keeping alert can be generated to alert drivers when they drift unintentionally from their lane, and a lane-keeping aid can be triggered to provide steering assistance to guide an unintentionally drifting vehicle back into its lane. In some examples, using data from the lane-keeping system, sensor(s) 190 can detect signs of fatigued driving and provide a warning via the driver's mobile device and/or other vehicle display.

Figure 1B:
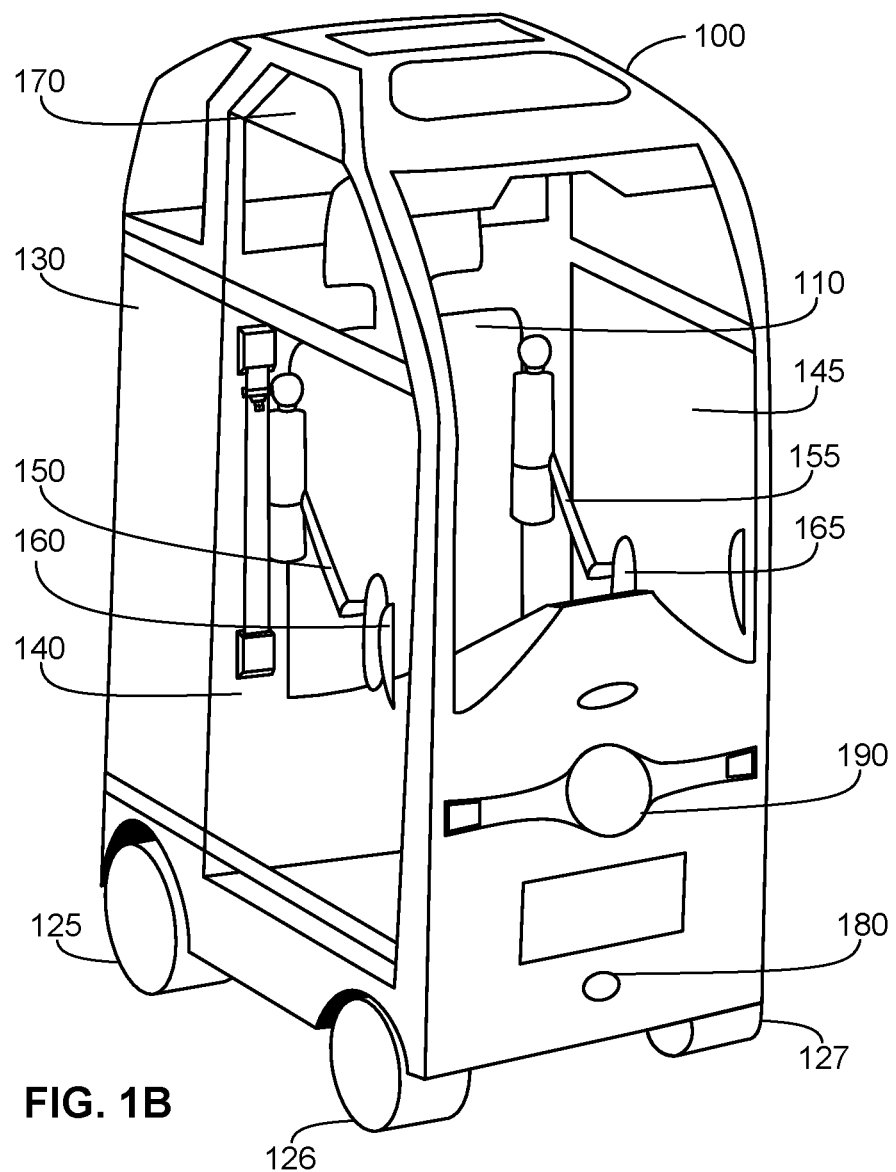

FIG. 1B illustrates another implementation of the example vehicle 100 in which the seat 110 includes multiple armrests 150, 155. In the example vehicle 100 of FIG. 1B, each armrest 150, 155 includes one or more sensors 160, 165. Control of the vehicle 100 is facilitated by the sensors 160, 165 installed in, on, and/or under the armrests 150, 155. Using the armrest sensor(s) 160, 165 can eliminate a steering wheel and/or pedal(s) in the cab 110 of the vehicle 100.

Figure 1C:
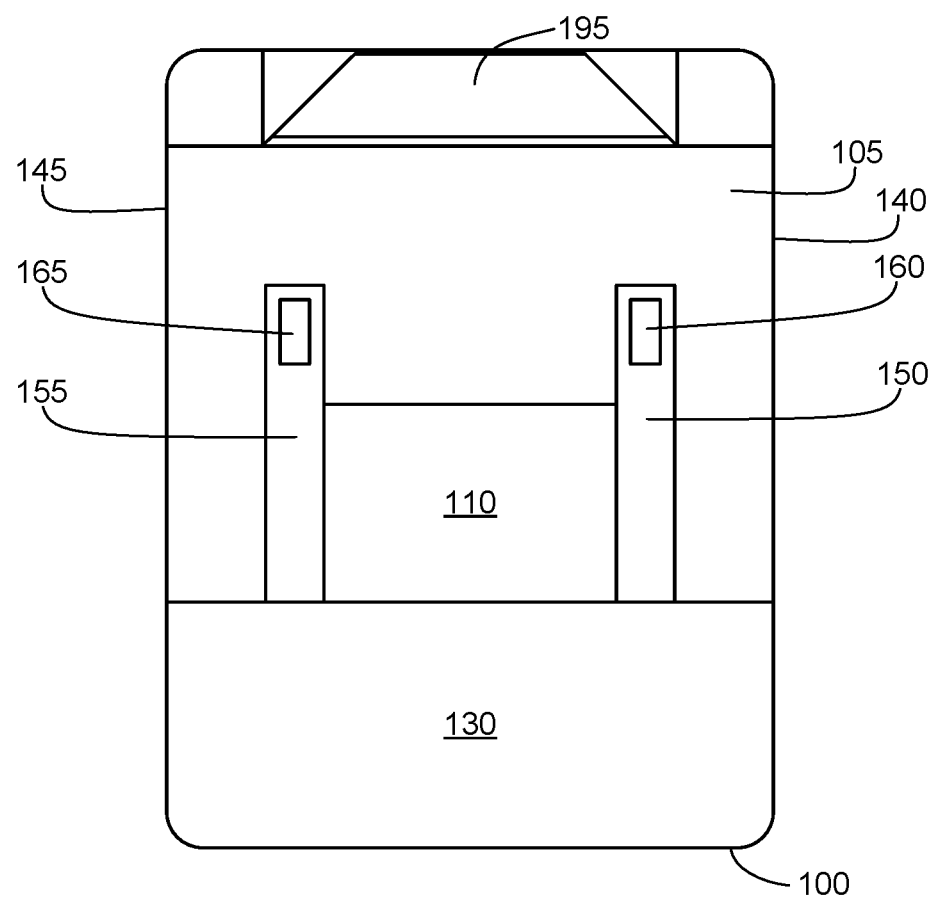

FIG. 1C illustrates a top view cutaway view of the example vehicle 100 including two armrests 150, 155. As shown in the example of FIG. 1C, a sensor 160, 165 is positioned in each armrest 150, 155 to facilitate user control of the vehicle 100. However, in certain examples, only one sensor 160 may be used with one or more armrests 150, 155.

The example of FIG. 1C also shows a mounting or rest 195 to position a user's mobile device, such as a smartphone, tablet, laptop, etc., to be used as a dashboard to view vehicle 100 information, monitor vehicle 100 performance, control vehicle 100 operation, etc. FIG. 1D provides an additional and/or alternative view of the example vehicle 100 in a perspective view showing the mounting or rest 195 for placement of the user's mobile device for vehicle status information, control, communication, etc.

Figure 2:
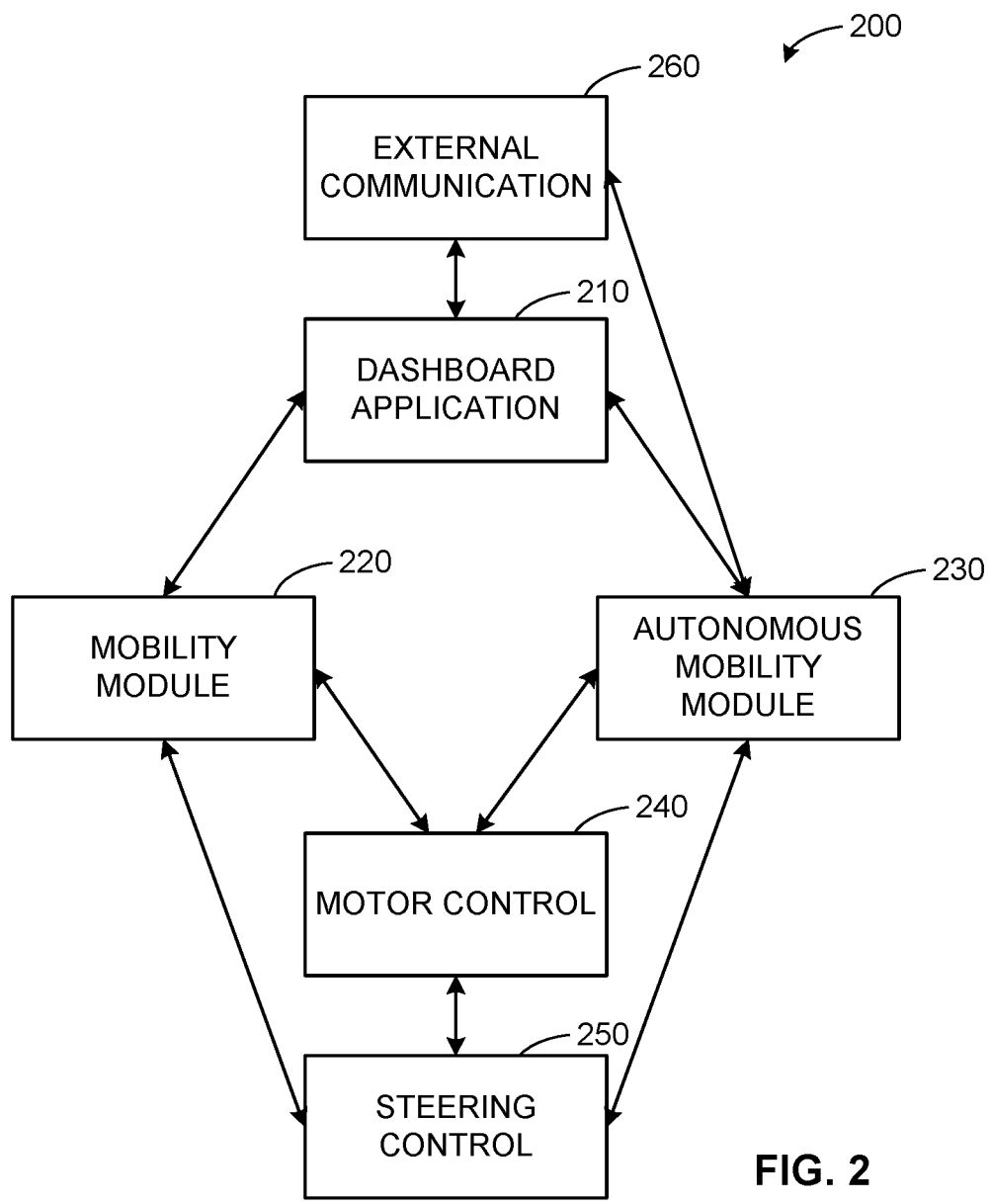
FIG. 2 illustrates an example vehicle control system to facilitate control of the vehicle of FIGS. 1A-1D.

FIG. 2 illustrates an example vehicle control system 200 to facilitate automated and/or user control of the example vehicle 100. The example vehicle control system 200 can be implemented using a mobile device (e.g., smartphone, tablet, laptop, etc.), a vehicle processor, a remote processor in communication with the vehicle 100, etc. In the example system 200, a dashboard application 210 interacts with a mobility module 220 and/or an autonomous mobility module 230 to trigger and control a motor control 240 and a steering control 250. In some examples, the control system 200 may not include the steering control 250, and steering is accomplished through actuation of one or both powertrains 120, 122 by the motor control 240. The dashboard application 210 can also interact with an external communication module 260, which uses the external communication interface 180 (e.g., Wi-Fi, cellular, Bluetooth, sub 1 GHz long range transceiver, etc.) to send and/or receive data, commands, etc.

Figure 3:
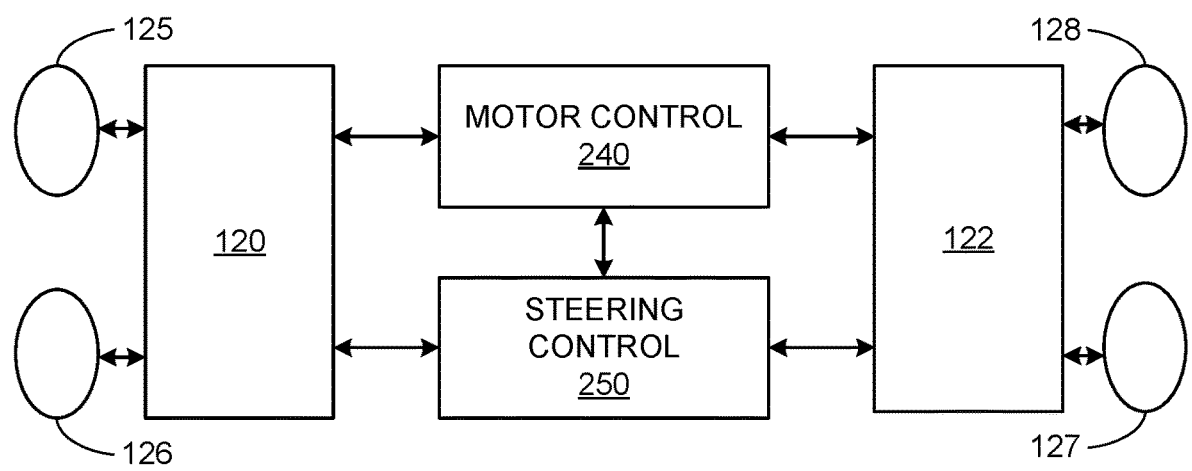
FIG. 3 shows an example motor and/or steering control of powertrains in the example vehicle of FIGS. 1A-1D.

Using the mobility module 220, for example, the motor control 240 and/or steering control 250 can be actuated to control one or both of the powertrains 120, 122 to maneuver the vehicle 100 in forward, reverse, turning right, turning left, etc., using its wheels 125-128 (see, e.g., the example of FIG. 3). For example, actuating, via the motor control 240 and/or steering control 250, the left powertrain 122 forward more than the right powertrain 120 turns the vehicle 100 to the right, and actuating the right powertrain 120 forward more than the left powertrain 122 turns the vehicle to the left. Actuating, via the motor control 240 and/or steering control 250, both powertrains 120, 122 equally drives the vehicle 100 straight (e.g., in forward or reverse).

The mobility module 220 is associated with the sensor(s) 160, 165 and receives user input (e.g., pressure, touch, etc.) to activate one or both powertrains 120, 122, adjust speed, turn, brake, etc. The input is translated into commands for the motor control 240 and/or steering control 250 to drive the powertrain(s) 120, 122 and associated wheels 125-128.

The autonomous mobility module 230 communicates with the user's mobile device and/or other external system to externally control the motor control 240 and/or steering control 250 to maneuver the vehicle 100 without steering wheel, pedal, etc. For example, the autonomous mobility module 230 can communicate with an external global positioning system (GPS) receiver via the communication module 260 and associated communication interface 180. A target location or destination may be determined based on the location of the vehicle 100 and GPS. The autonomous mobility module 230 autonomously triggers the motor control 240 and/or steering control 250 to drive the vehicle 100.

In certain examples, the autonomous mobility module 230 is used to remotely maneuver the vehicle 100 into a loading area, parking space, etc. When the vehicle 100 is within a target distance of the loading/parking space, the autonomous mobility module 230 works in conjunction with the communication module 260 and/or dashboard application 210 to maneuver into position in the target space. In some examples, a GPS receiver may be used to position the vehicle 100 approximately at a target location, and additional detection sensors such as radar, LIDAR, ultrasound, camera, etc. may be used to determine a more refined position for the vehicle at the target location and maneuver the vehicle 100 to that target location. In certain examples, such information can be used to maintain a target distance, speed, etc., with respect to the target location, other vehicle, obstacle, etc.

Thus, the autonomous mobility module 230 operates in conjunction with sensor(s) 190 and external communication 180, 260 to monitor, track, and/or control movement of the vehicle 100. In some examples, an external system determines a navigation route and provides the navigation route to the autonomous mobility module 230 via the external communication interface 180 and associated communication module 260. The autonomous mobility module 230 can then control the motor control 240 and/or steering control 260 to guide the vehicle 100 to the desired location. In some examples, sensor(s) 190 mounted on or in the vehicle 100 can guide the autonomous mobility module 230 without external system input to find a space clear of other objects for moving, parking, etc. If an object, obstacle, change in route option, etc., is detected, an alert can be displayed to a user via the dashboard application 210.

In certain examples, movement of the vehicle 100 is controlled by one or more fingers with respect to sensor(s) 160, 165 triggering the mobility module 220 to actuate the motor control 240 and/or the steering control 250 to control the powertrain(s) 120, 122 and move the wheels 125-128. For example, certain sensor 160, 165 configurations including pressure sensors under certain fingers such as thumb, index, middle, and/or ring fingers with a palm presence sensor to activate the armrest 150, 155 control. In some such examples, the user's arm, wrist and palm can remain at rest while pressure by one or more fingers provides input to the mobility module 220 via the sensor(s) 160, 165.

Figure 4A:
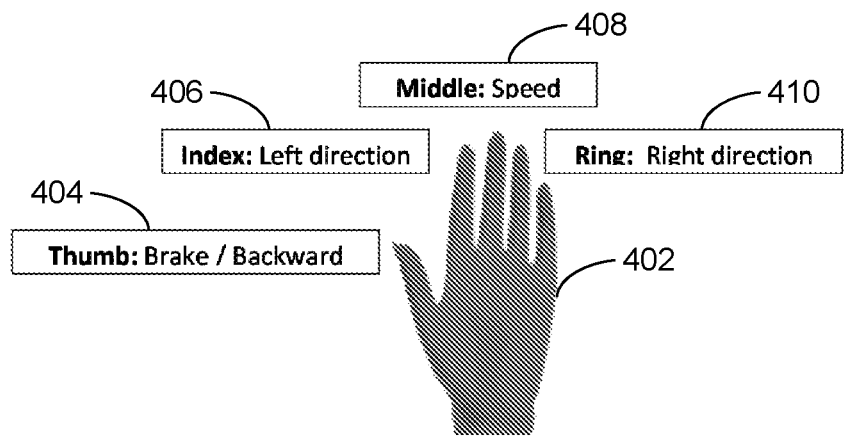
FIGS. 4A-4B show example actuation of sensors in the example vehicle based on finger position and/or movement.
Figure 4B:
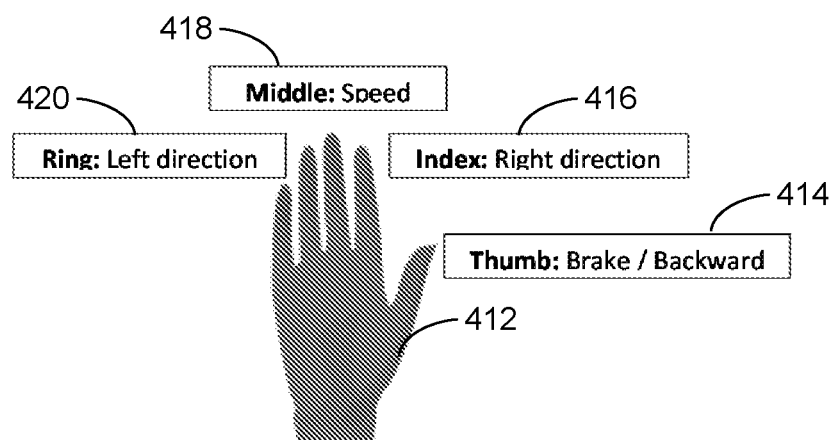

As illustrated in the examples of FIGS. 4A-4B, the sensors 160 and/or 165 can be activated by user hand pressure/movement using one or more hands, fingers, etc. For example, FIG. 4A shows a top view of an example right hand 402 along with corresponding movements to trigger corresponding motor control 240 and/or steering control 250 functions of the powertrains 120, 122 via the sensor(s) 160, 165 and mobility module 220. For example, pressing at least a portion of the sensor 160 with the thumb of the right hand 402 actuates a braking (e.g., if the vehicle 100 is currently in motion) and/or backward (e.g., if the vehicle 100 is currently stopped) movement 404 of the vehicle 100. Pressing at least a portion of the sensor 160 with the index finger of the right hand 402 actuates motion and/or turning in the left direction 406 for the vehicle 100. Pressure on the sensor 160 using the middle finger of the right hand 402 controls speed and/or acceleration 408 of the vehicle 100. Pressing at least a portion of the sensor 160 with the ring finger of the right hand 402 actuates motion and/or turning in the right direction 410 for the vehicle 100.

FIG. 4B shows a top view of an example left hand 412 along with corresponding movements to trigger corresponding motor control 240 and/or steering control 250 functions of the powertrains 120, 122 via the sensor(s) 160, 165 and mobility module 220. For example, pressing at least a portion of the sensor 165 with the thumb of the left hand 412 actuates a braking (e.g., if the vehicle 100 is currently in motion) and/or backward (e.g., if the vehicle 100 is currently stopped) movement 414 of the vehicle 100. Pressing at least a portion of the sensor 165 with the index finger of the left hand 412 actuates motion and/or turning in the right direction 416 for the vehicle 100. Pressure on the sensor 165 using the middle finger of the left hand 412 controls speed and/or acceleration 418 of the vehicle 100. Pressing at least a portion of the sensor 165 with the ring finger of the left hand 412 actuates motion and/or turning in the left direction 420 for the vehicle 100.

In certain examples, control of vehicle 100 mobility is facilitated using one hand with respect to a single sensor 160 or 165. Using the right 402 or left 412 hand, an electric brake is active when the vehicle 100 is stopped. If the thumb 404, 414 is pressed in the stopped state, the vehicle 100 enables a reverse gear in the powertrains 120, 122, and a pressure value associated with the middle finger 408, 418 on the sensor 160 or 165 starts movement to that direction with a proportional speed. While moving backwards (e.g., in reverse), braking can be activated by releasing pressure from the thumb 404, 414 on the sensor 160, 165. Decreasing pressure by the thumb 404, 414 and/or middle finger 408, 418 reduces speed proportionally. Forward motion can be facilitated using the middle finger 408, 418 to apply pressure to the sensor 160, 165 without the thumb 404, 414 to engage a forward gear of the powertrain 120, 122 and increases speed proportional to the amount of pressure by the middle finger 408, 418. Pressure can be applied to the sensor 160, 165 by other fingers to add left 406, 420 or right 410, 416 motion to the movement of the vehicle 100. Directionality of the vehicle 100 can be determined based on a difference in speed between left and right powertrains 120, 122 corresponding to a degree of pressure exerted on the sensor 160, 165 by the ring 410, 420 and index 406, 416 fingers of the hand 402, 412 being used for control. Using this control method, sensors can control speed, forward/backward direction, right/left turning, and braking using a single hand. Directional control can be exercised by the increase or decrease of each finger pressure and/or by a combination of differential pressure values of multiple fingers on the sensor 160, 165. In certain examples, if the vehicle 100 is being controlled remotely via the autonomous mobility module 230, input to the mobility module 220 via the sensor(s) 160, 165 can override the external/autonomous mobility instruction(s).

Certain examples enable two-handed control of vehicle 100 mobility. As described above, either hand 402, 412 can interact with its corresponding sensor 160, 165 to control mobility of the vehicle 100. In certain examples, the first sensor 160, 165 activated controls mobility of the vehicle 100 as described above. In some examples, the first sensor 160, 165 activated is the dominate sensor 160, 165 for mobility control, but the other sensor 160, 165 can be used to augment mobility control as long as its input to the motor control 240 and/or steering control 250 does not contradict the input from the dominant sensor (e.g., if both sensors 160, 165 are actuated at the same time or substantially the same time given some transmission and/or processing delay, etc.).

Figure 5:
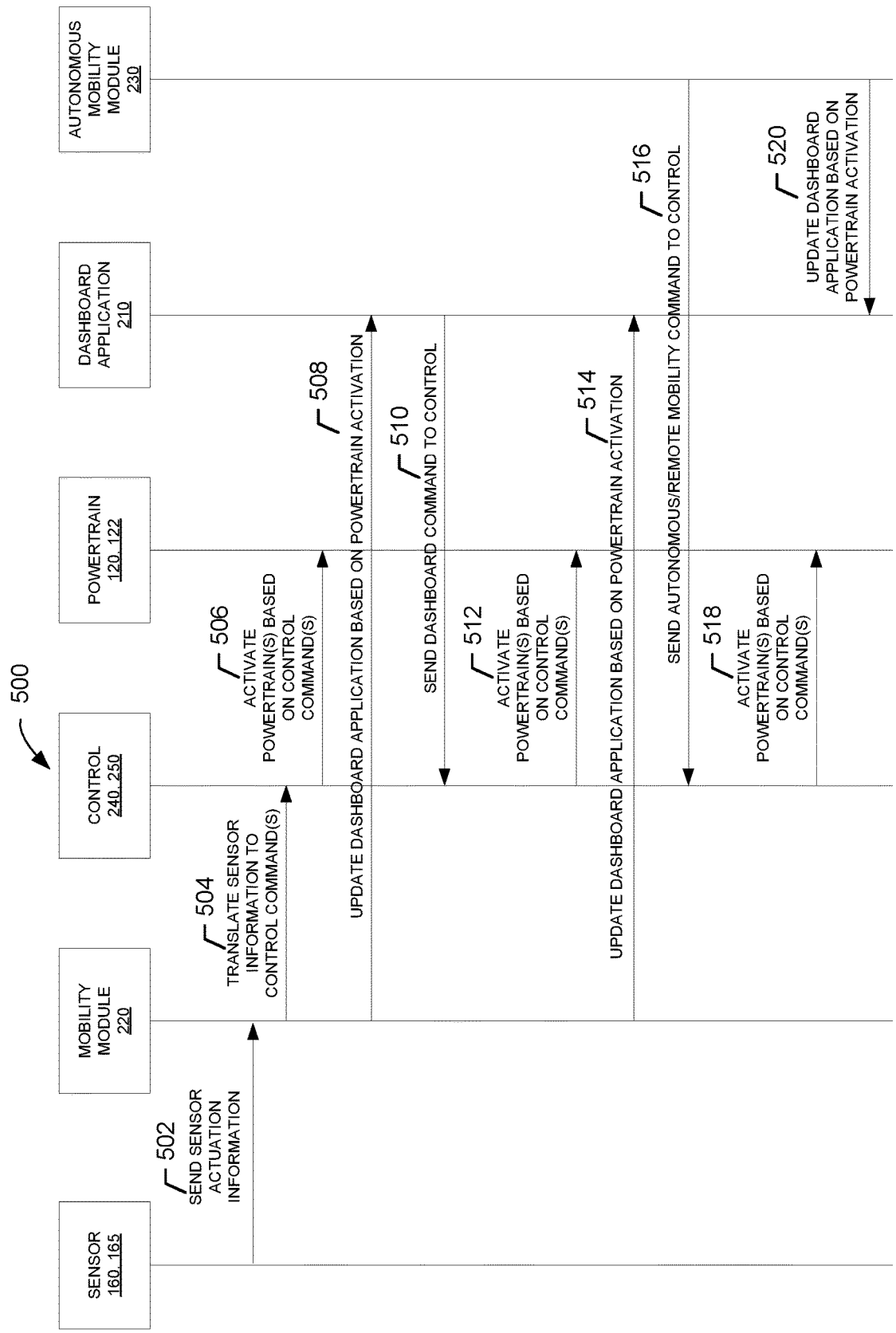
FIG. 5 illustrates an example data flow of message exchange to facilitate mobility control over the example vehicle of FIGS. 1A-1D.

FIG. 5 illustrates an example data flow 500 of message exchange to facilitate mobility control of the vehicle 100. As shown in the example of FIG. 5, a first message 502 for the mobility module 220 is generated when the sensor 160, 165 is actuated (e.g., pressured by one or more fingers against the sensor(s) 160, 165 in the armrest(s) 150, 155, etc.). A second message 504 is generated when the mobility module 220 translates the sensor information into control command(s) for the motor control 240 and/or steering control 250. The control 240 and/or 250 then generates a third message 506 to activate the powertrain(s) 120, 122 based on the control command(s). After activating the powertrain(s) 120, 122, a message 508 updates the dashboard application 210 based on the powertrain 120, 122 activation.

In some examples, a message 510 including command(s) from the dashboard application 210 can adjust the motor control 240 and/or steering control 250. A message 512 from the control 240 and/or 250 then activates the powertrain(s) 120, 122 based on the control command(s). After activating the powertrain(s) 120, 122, a message 514 updates the dashboard application 210 based on the powertrain 120, 122 activation.

In some examples, a message 516 including command(s) for remote/autonomous mobility is sent via the autonomous mobility module 230 to the motor control 240 and/or steering control 250. The control 240 and/or 250 then generates a message 518 to activate the powertrain(s) 120, 122 based on the control command(s). After activating the powertrain (s) 120, 122, a message 520 updates the dashboard application 210 based on the powertrain 120, 122 activation.

Figure 6:
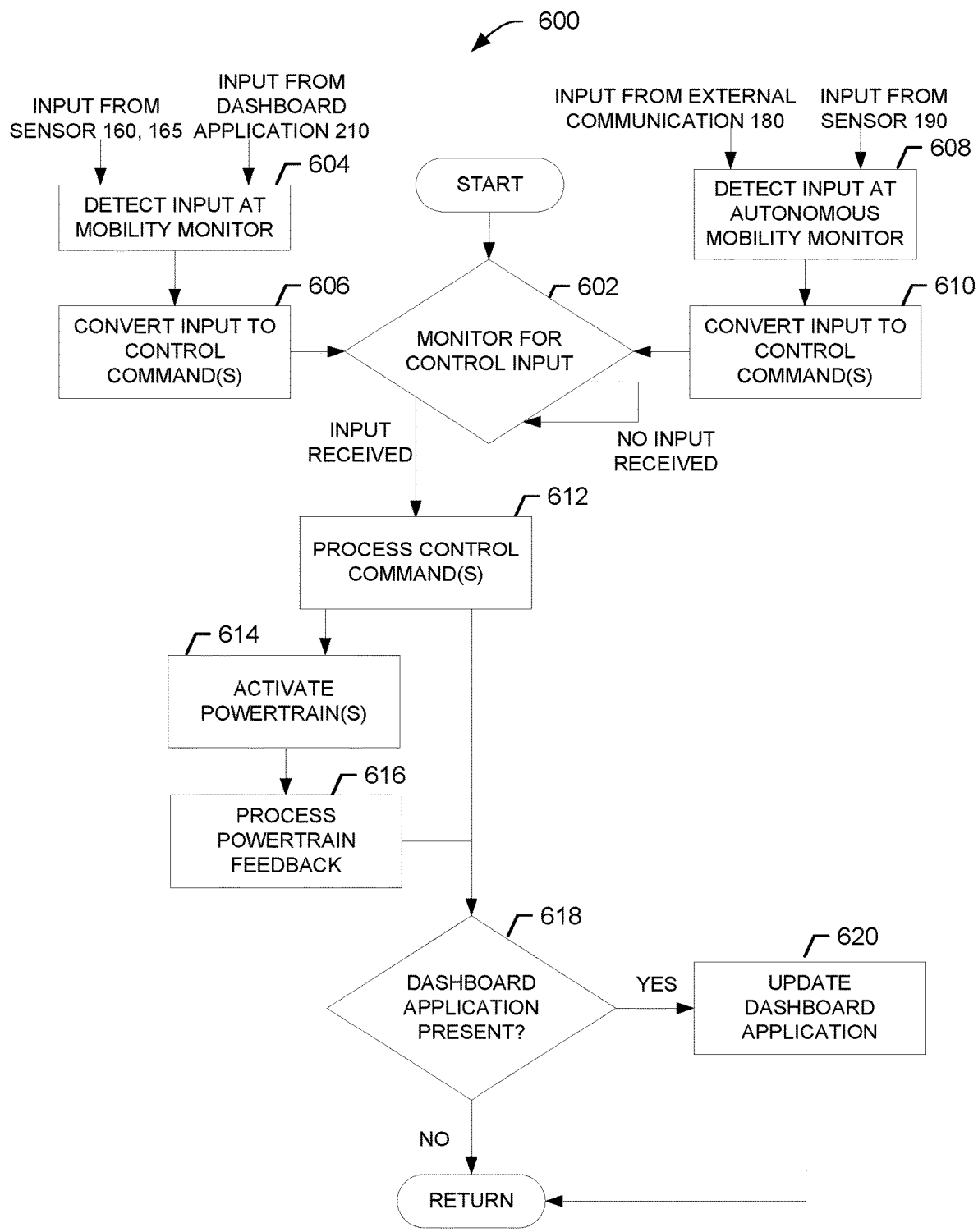
FIG. 6 illustrates a flow diagram of an example method to control the example vehicle of FIGS. 1A-1D.

A flowchart representative of example method(s) for implementing the examples disclosed herein is shown in FIG. 6. The example methods may be implemented by machine readable instructions that comprise a program(s) for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the examples disclosed herein may alternatively be used. For example, the order of execution of the blocks may be changed, and/or some of the blocks described may be changed, eliminated, or combined.

As mentioned above, the example method(s) of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method(s) of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to FIG. 6, an example method 600 begins at block 602, at which the motor control 240 and/or steering control 250 monitors for control input to the powertrain(s) 120, 122. For example, the motor control 240 and/or steering control 250 can receive input from the mobility module 220 (e.g., via the sensor(s) 160, 165, the dashboard application 210, etc.) and/or the autonomous mobility module 230 (e.g., via the sensor(s) 190, from an external system via the communication interface 180, etc.) to control the powertrain(s) 120, 122.

At block 604, the mobility module 220 detects input from the sensor 160, 165 and/or dashboard application 210. For example, the mobility module 220 awaits a signal from the sensor 160, 165 corresponding to an area of actuation and/or degree of pressure on the area of the sensor 160, 165. For example, the sensor(s) 160 165 positioned on and/or in the armrest(s) 150, 155 are pressured using one or more fingers of one or more hands as described above. The application of pressure to the sensor 160, 165 triggers a signal from the sensor 160,165 to the mobility module 220 representative of a control command.

Alternatively or in addition, at block 604, the mobility module 220 detects input from the dashboard application 210. For example, a user interacts with a graphical user interface (e.g., displayed on a smartphone, tablet, and/or other mobile device, etc.) serving as a front end to the dashboard application 210 and triggers a slow down, speed up, turn, etc., of the vehicle 100.

At block 606, the mobility module 220 converts the received signal into control command(s) for the powertrain(s) 120, 122. For example, an area of contact on the sensor 160, 165 (e.g., thumb, index finger, middle finger, ring finger, etc., as described above with respect to FIG. 4) and/or a degree of pressure applied to the area are received by the mobility module 220 and converted into a direction of motion and/or a speed of motion (e.g., in the identified direction). The direction and/or speed of motion is converted into control command(s) to be sent by the mobility module 220 to the motor control 240 and/or steering control 250, for example. As another example, selected input from the dashboard application 210 is converted into control command(s) to be sent by the mobility module 220 to the motor control 240 and/or steering control 250. At block 602, the motor control 240 and/or steering control 250 receives the control command(s).

Alternatively or in addition, at block 608, the autonomous mobility module 230 detects input. For example, the autonomous mobility module 230 detects input from the sensor 190 (e.g., ultrasonic, LIDAR, radar, etc.) associated with the vehicle 100. The autonomous mobility module 230 can also detect input from a remote system via the communication interface 180, for example.

At block 610, the autonomous mobility module 230 converts the received signal into control command(s) for the powertrain(s) 120, 122. For example, an indication of direction, speed, nearby obstacle(s) to avoid, etc., provided through automated sensor 190 and/or external source communication (e.g., via interface 180) is converted into control command(s) to be sent by the autonomous mobility module 230 to the motor control 240 and/or steering control 250. At block 602, the motor control 240 and/or steering control 250 receives the control command(s).

At block 612, the motor control 240 and/or steering control 250 processes received control command(s). For example, the motor control 240 and/or steering control 250 parse the received command(s) and generate activation parameters for the powertrain(s) 120, 122 based on the received control command(s). For example, received direction and/or speed information are translated by the motor control 240 and/or steering control 250 into a speed differential between left and right powertrains 120, 122, etc.

At block 614, the motor control 240 and/or steering control 250 activate the powertrain(s) 120, 122. For example, a single powertrain 120, 122 can be activated (e.g., to turn). Alternatively, both powertrains 120, 122 can be activated equally (e.g., to move straight forward or backward), for example. Alternatively, both powertrains 120, 122 can be activated at a differential (e.g., one powertrain faster than the other) to create motion of the vehicle 100 with an angle or non-straight direction of movement, for example.

At block 616, the powertrain(s) 120, 122 provide feedback to the motor control 240 and/or steering control 250. For example, the powertrain(s) 120, 122 provide an acknowledgement of received command(s), a confirmation of speed, direction, etc., a brake status, engine status, etc.

At block 618, a presence or absence of the dashboard application 210 is determined. If no dashboard application 210 is present (e.g., no mobile device is currently tethered to the vehicle 100 and displaying vehicle 100 information, etc.), then control returns (e.g., to block 602 to monitor for additional control input, etc.).

However, if the dashboard application 210 is detected, then, at block 620, the dashboard application 210 is updated based on the powertrain 120, 122 activation. For example, current speed, angle, direction, powertrain 120, 122 status, control status, etc., can be displayed via the dashboard application 210 on a mobile device for information, further control, etc. Control then returns (e.g., to block 602 to monitor for additional control input, etc.).

Thus, certain examples provide a vehicle configured for automatic maneuvering, solar charging, having a reduced parking space footprint and increased cargo load volume. Certain examples provide an improved vehicle 100 in which driver vertical position and sliding doors reduce occupied space and allow users comfortable access to the vehicle 100. Inside the vehicle 100, armrest(s) 150, 155 are equipped with sensor(s) 160, 165 to allow the vehicle 100 to be driven without a steering wheel and pedals. For example, sensor(s) 160, 165 can be on or in armrest(s) 150, 155 and/or integrated into controlling arm(s) for manipulation. The vehicle includes a cargo area 130 with a large loading volume capacity. Further, automated driverless maneuverings facilitate entering and exiting of loading/unloading spaces, charging stations, etc., to provide maneuverability and functionality while reducing the space used by the vehicle 100. Air filtration in the cabin 105 via the air filtration unit 170 provides cleaner air and a healthier environment for people in the cab 105 of the vehicle 100.

Figure 7:
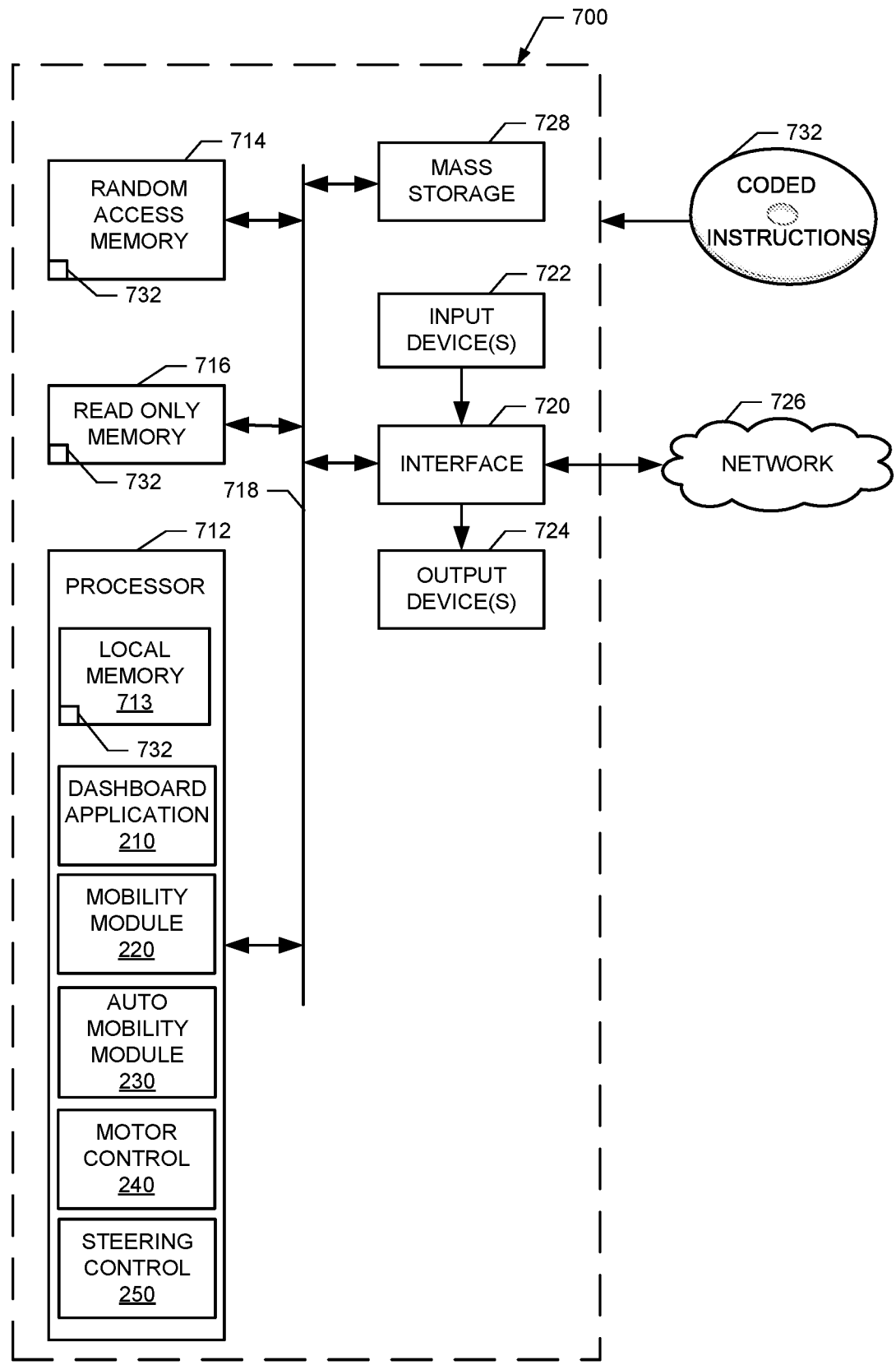
FIG. 7 is a block diagram of an example processor platform capable of executing instructions to implement the examples disclosed herein.

Certain examples provide a vehicle 100 controllable by a user's mobile device (e.g., smartphone, tablet, laptop, etc.) tethered with the vehicle 100 for use as a dashboard 210 for information, control, etc. The mobile device can be charged wired and/or wirelessly via a mounting/rest 195, for example. The mobile device dashboard 210 and/or external sensor(s) 190 can be used to facilitate automated and/or remote management of the vehicle 100. Integrated technologies assist a user in executing his or her itinerary using the user's own electronically tethered device with the vehicle 100. The dashboard 210 integrates the vehicle 100 into a smart mobility ecosystem through communication channel(s) 180, for example. A combination of armrest sensor input, external sensor input, and remote input facilitate autonomous and integrated maneuvering, as well as assisted driving, of the vehicle for an improved experience FIG. 7 is a block diagram of an example processor platform 700 capable of executing instructions to implement the examples disclosed herein. The processor platform 700 can be, for example, a semiconductor fabrication device, a wafer/die production controller, a wafer producing/processing device, a die/wafer etching device, a server, a personal computer, a mobile device (e.g., a cell phone, a smart phone, a tablet such as an iPad™), a personal digital assistant (PDA), an Internet appliance, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the examples described herein may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture provide improved vehicle control and dynamic maneuverability. The disclosed examples improve environmental health and safety for a user in the cabin while also improving local, remote, and autonomous maneuverability of the vehicle in and around obstacles. Thus, a cleaner, more responsive, and more accurate vehicle is disclosed to facilitate transportation of passengers and goods in crowded environments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle comprising:
   a sensor positioned with respect to a seat to detect pressure by a user with respect to the sensor to generate a first signal corresponding to the pressure; and
   a processor to monitor for control input including the first signal, a second signal from a dashboard application, and a third signal from an external source, the processor to convert a received at least one of the first signal, the second signal, or the third signal into control commands for motor control and steering control and to activate a powertrain to move the vehicle based on the control commands.

2. The vehicle of claim 1, wherein the sensor is incorporated into an armrest of the seat inside the vehicle.

3. The vehicle of claim 1, wherein the sensor is incorporated into a controlling arm of the seat inside the vehicle.

4. The vehicle of claim 1, wherein the sensor is a first sensor, and further including a second sensor to detect pressure by the user with respect to the second sensor, wherein the second sensor is to generate a second signal corresponding to the pressure.

5. The vehicle of claim 1, wherein the pressure corresponds to movement by a finger of the user on an area of the sensor corresponding to at least one of a) move forward, b) move backward, c) brake, d) left, or e) right.

6. The vehicle of claim 1, wherein the powertrain includes left and right powertrains, and wherein a mobility module adjusts a direction of movement of the vehicle by creating a speed differential between the left and right powertrains.

7. The vehicle of claim 1, further including the dashboard application to display information regarding the vehicle, the dashboard application configured to execute on a mobile device tethered to the vehicle.

8. The vehicle of claim 1, further including an external sensor to provide autonomous input to control movement of the vehicle.

9. The vehicle of claim 1, further including a communication interface to receive a control command from an external system.

10. A tangible computer readable storage medium comprising instructions that, when executed, cause a machine to at least:

detect pressure by a user with respect to a sensor in a vehicle, the sensor positioned with respect to a seat in the vehicle;

generate a first signal corresponding to the pressure;

monitor for control input including the first signal, a second signal from a dashboard application, and a third signal from an external source; and convert a received at least one of the first signal, the second signal, or the third signal into control commands for motor control and steering control and to activate a powertrain to move the vehicle based on the control commands.

11. The storage medium of claim 10, wherein the pressure corresponds to movement by a finger of the user on an area of the sensor corresponding to at least one of a) move forward, b) move backward, c) brake, d) left, or e) right.

12. The storage medium of claim 10, wherein the powertrain includes left and right powertrains, and wherein the instructions, when executed, further cause the machine to adjust a direction of movement of the vehicle by creating a speed differential between the left and right powertrains of the vehicle.

13. The storage medium of claim 10, wherein the instructions, when executed, further cause the machine to update the dashboard application to display information regarding the vehicle, the dashboard application configured to execute on a mobile device tethered to the vehicle.

14. The storage medium of claim 10, wherein the instructions, when executed, further cause the machine to control movement of the vehicle based on autonomous input from an external sensor.

15. The storage medium of claim 10, wherein the instructions, when executed, further cause the machine to receive a control command from an external system via a communication interface.

16. A method comprising:

detecting, using a sensor, pressure by a user with respect to the sensor in a vehicle, the sensor positioned with respect to a seat in the vehicle;

generating, by executing an instruction with a processor, a first signal corresponding to the pressure;

monitoring, by executing an instruction with a processor, for control input including the first signal, a second signal from a dashboard application, and a third signal from an external source; and converting, by executing an instruction with the processor, a received at least one of the first signal, the second signal, or the third signal into control commands for motor control and steering control and to activate a powertrain to move the vehicle based on the control commands.

17. The method of claim 16, wherein the pressure corresponds to movement by a finger of the user on an area of the sensor corresponding to at least one of a) move forward, b) move backward, c) brake, d) left, or e) right.

18. The method of claim 16, wherein the powertrain includes left and right powertrains, and further including adjusting a direction of movement of the vehicle by creating a speed differential between the left and right powertrains of the vehicle.

19. The method of claim 16, further including updating the dashboard application to display information regarding the vehicle, the dashboard application configured to execute on a mobile device tethered to the vehicle.

20. The method of claim 16, further including controlling movement of the vehicle based on autonomous input from an external sensor.

* * * * *